(12) United States Patent
Yu et al.

(10) Patent No.: US 10,535,970 B2
(45) Date of Patent: Jan. 14, 2020

(54) PRESS-FIT APPARATUS FOR CONNECTORS

(71) Applicant: INTERNATIONAL BUSINESS MACHINES CORPORATION, Armonk, NY (US)

(72) Inventors: Qiuyi Yu, Shenzhen (CN); Na Fan, Shenzhen (CN); Zhao Lin, Shenzhen (CN); Xingquan Dong, Shenzhen (CN); WeiFeng Zhang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/415,355

(22) Filed: Jan. 25, 2017

(65) Prior Publication Data

US 2018/0212392 A1 Jul. 26, 2018

(51) Int. Cl.
*H01R 43/20* (2006.01)
*H01R 12/58* (2011.01)
*H01R 12/70* (2011.01)

(52) U.S. Cl.
CPC ......... *H01R 43/205* (2013.01); *H01R 12/585* (2013.01); *H01R 12/7011* (2013.01); *H01R 12/7076* (2013.01)

(58) Field of Classification Search
CPC .......... H01R 43/205; H01R 12/585; H01R 12/7011; H01R 12/7076; Y10T 29/53183; Y10T 29/53022; Y10T 29/53039; H05K 3/306; H05K 3/32
See application file for complete search history.

(56) References Cited

U.S. PATENT DOCUMENTS

| | | | |
|---|---|---|---|
| 4,367,583 A * | 1/1983 | Baccei | H01R 43/205 29/739 |
| 4,451,975 A | 6/1984 | Baccei | |
| 4,510,683 A * | 4/1985 | Fedde | B23P 19/00 29/701 |
| 4,964,211 A * | 10/1990 | Arao | B23P 19/00 29/705 |
| 5,499,443 A | 3/1996 | Ota et al. | |

(Continued)

FOREIGN PATENT DOCUMENTS

EP 0 633 094 B1 9/1998
WO WO-2015199045 A1 * 12/2015 ............. H05K 13/04

*Primary Examiner* — Peter Dungba Vo
*Assistant Examiner* — Jeffrey T Carley
(74) *Attorney, Agent, or Firm* — Scully Scott Murphy & Presser, P.C.; Tihon Poltavets, Esq.

(57) ABSTRACT

An apparatus and method for press-fitting a connector to a circuit board is provided. The apparatus has a universal press block fixedly connected to a machine press head. A bottom plate of the universal press block has multiple locating holes. A locating block is fixedly connected to the bottom plate. A press block is fixedly connected to the locating block at a predetermined position suitable for press-fitting the connector. The press block has a press block head, a press block body and a sensor provided between the head and the body. The press block head is movable to contact the connector to apply a pressing force to the connector. The sensor detects the pressing force and generates a signal indicative of the pressing force. The press block body receives the signal from the sensor and controls the movement of the press block head based on the signal.

15 Claims, 4 Drawing Sheets

(56) References Cited

U.S. PATENT DOCUMENTS

| | | | | |
|---|---|---|---|---|
| 5,509,192 A | * | 4/1996 | Ota | H01R 43/205 |
| | | | | 29/703 |
| 6,834,428 B2 | * | 12/2004 | Ravert, Jr. | H01R 43/205 |
| | | | | 29/842 |
| 2015/0128411 A1 | * | 5/2015 | Watanabe | H05K 13/0404 |
| | | | | 29/837 |
| 2017/0034968 A1 | * | 2/2017 | Yokoyama | H05K 13/0413 |

* cited by examiner

PRESS-FIT APPARATUS FOR CONNECTORS

BACKGROUND

The present disclosure and embodiments thereof are in the field of a mechanical pressing instrument. More particularly, the present disclosure relates to an apparatus, which is capable of simultaneously pressing different connectors into circuit boards.

Press-fit machines have been used to press connectors into circuit boards to provide so-called "press-fit" type connections. Typically, for the "press-fit" type connections, a connector having contact pins and a circuit board having respective holes for receiving the contact pins are pressed together to meet certain mechanical and electrical connection requirement. In operation, the press-fit machines provide forces and motions that move the contact pins of the connector into the receiving holes of the circuit board, respectively.

One existing problem with the known press-fit machines is that connectors of different modules cannot be pressed at the same time. Moreover, when the same modular connectors are being pressed, each individual connector's fitting curve cannot be obtained independently. Rather, a single fitting curve associated with all modular connectors, which is normally of a low accuracy, can be obtained. In operation, one type of modular connectors, which have the same or similar parameters, may be pressed at a same time. As known in the industry, the fitting curves obtained during the operation of the press-fit machines contain the most critical parameters of the press-fitting operation. The single fitting curve of the plurality of modular connectors is apparently inadequate for discerning and monitoring the operation status of the press-fit machines with respect to each individual modular connector. For example, during operation, the same pressing force proper for one modular connector may not be proper for another modular connector in the same group. As a result, the quality of the final products cannot be ensured. Moreover, in the production line of circuit devices, the press-fitting station has gradually become the bottle neck, which impacts the capacity of the entire production line. In addition, different press-fit machines specialized for specific modular connectors may be needed in the production line, which apparently affects the efficiency of the production line.

Accordingly, there exists a need in the art to overcome the deficiencies and limitations described hereinabove with respect to the conventional press-fit machines and their operations.

SUMMARY

According to an aspect of the present application, an apparatus for press-fitting a plurality of connectors to a circuit board is provided. The apparatus includes a machine press head movable by a power supplier of the press-fit apparatus. The apparatus further includes a universal press block fixedly connected to the machine press head to be movable with the machine press head. The universal press block includes a bottom plate having a plurality of locating holes. The apparatus also includes at least one locating block fixedly connected to the bottom plate. The locating block includes a locating block screw, which is threaded into one of the plurality of locating holes to fixedly connect the locating block to the universal press block. The apparatus additionally includes at least one press block. The press block is fixedly connected to the locating block at a predetermined position suitable for press-fitting one of the plurality of connectors. The press block includes at least one press block screw for fixedly connecting the at least one press block to the locating block. The press block further includes a press block head that is movable to be in contact with the one of the plurality of connectors to apply a pressing force to the connector. The press block also includes a sensor configured to detect the pressing force and generate a signal indicative of the pressing force. The press block additionally includes a press block body configured to receive the signal from the sensor and control the movement of the press block head based on the signal.

According to another aspect of the present application, a method of press-fitting at least one connector to a circuit board by using a press-fit apparatus is provided. The method includes fixing a locating block to a bottom plate of a universal press block. The universal press block is fixed to a machine press head to be moveable with the machine press head. The bottom plate has a plurality of locating holes. The locating block is fixed to the bottom plate by inserting a first fastener of the locating block selectively into one of the plurality of locating holes. The method further includes fixing a press block to the locating block at a predetermined position suitable for press-fitting the connector by using a second fastener. The press block includes a press block head movable to be in contact with the connector to apply a pressing force to the connector; a sensor configured to detect the pressing force and generate a signal indicative of the pressing force; and a press block body configured to receive the signal from the sensor and control the movement of the press block head based on the signal.

According to yet another aspect of the present application, a method of manufacturing a press-fit apparatus suitable for press-fitting a plurality of connectors to a circuit board is provided. The method includes providing a machine press head that is movable by a power supplier of the press-fit apparatus. The method further includes fixing a universal press block to the machine press head to allow the universal press block to be movable with the machine press head. The universal press block includes a bottom plate having a plurality of locating holes. The method also includes fixing at least one locating block to the bottom plate of the universal press block, by inserting a locating fastener of the at least one locating block into one of the plurality of locating holes. The method additionally includes fixing at least one press block to the at least one locating block at a predetermined position suitable for press-fitting one of the plurality of connectors. The at least one press block includes at least one press block fastener for fixedly connecting the at least one press block to the at least one locating block. The press block includes a press block head, which is movable to be in contact with the one of the plurality of connectors to apply a pressing force to the one of the plurality of connectors. The press block further includes a sensor configured to detect the pressing force and generate a signal indicative of the pressing force. The press block also includes a press block body configured to receive the signal from the sensor and control the movement of the press block head based on the signal.

DETAILED DESCRIPTION OF EMBODIMENTS

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

Detailed embodiments of the methods and apparatuses of the present disclosure are described herein; however, it is to be understood that the disclosed embodiments are merely illustrative of the disclosed methods and apparatuses that may be embodied in various forms. In addition, each of the examples given in connection with the various embodiments of the disclosure are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure. For the purposes of the description hereinafter, the terms "upper", "lower", "top", "bottom", and derivatives thereof shall relate to the disclosed structures, as they are oriented in the drawing figures.

Figure 1:
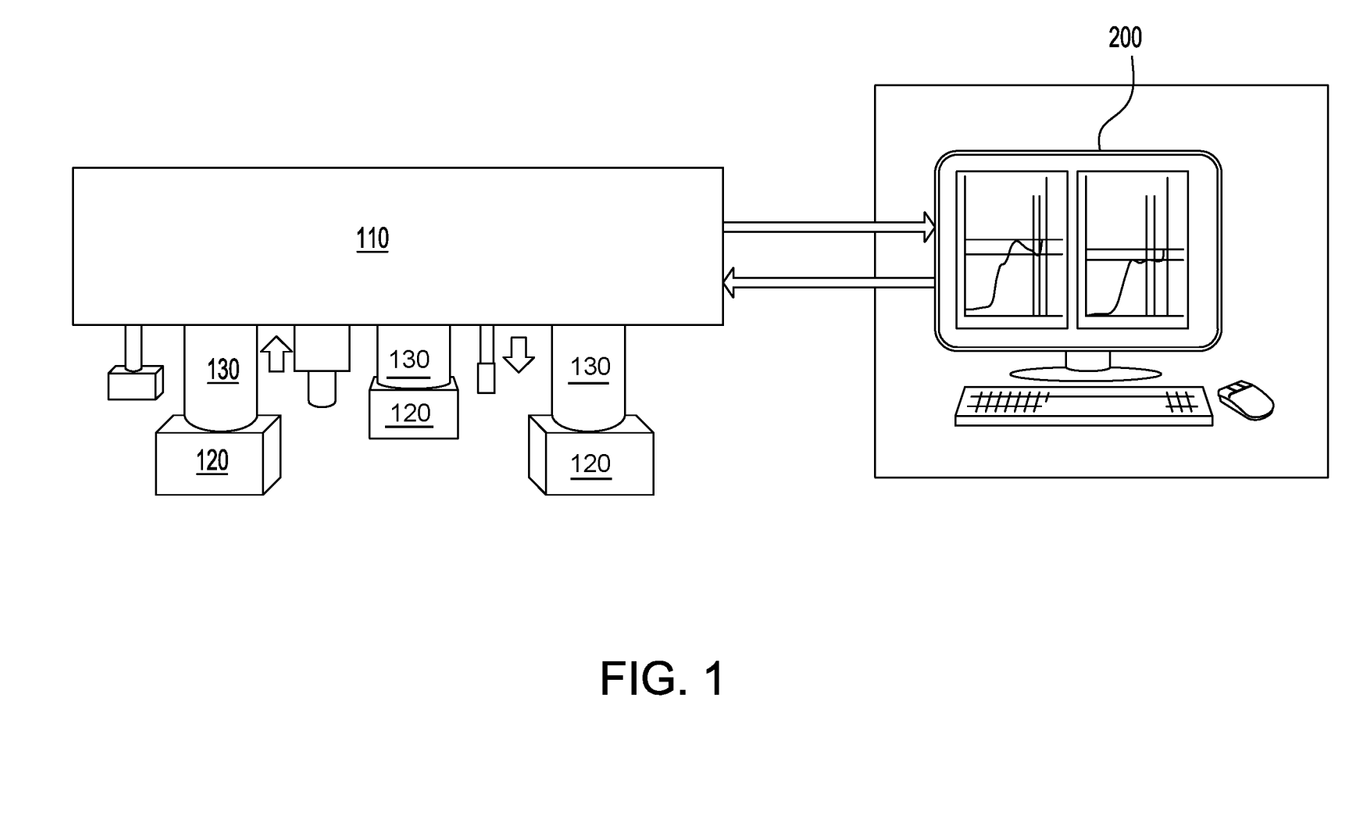
FIG. 1 is a schematic view of a press-fit apparatus according to an exemplary embodiment of the present disclosure.

FIG. 1 is a schematic view of a press-fit apparatus 100 according to an exemplary embodiment of the present disclosure. The press-fit apparatus 100 includes, but is not limited to, a controller block 110, a plurality of press blocks 120 and a plurality of sensors 130. The press-fit apparatus 100 is in wireless or wired communication with a hardware processor 200. The hardware processor 200 can be a computer, CPU, CMU, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. The processor may be a microprocessor, but in the alternative, the processor may be any conventional processor, controller, microcontroller, or state machine. The processor may also be implemented as a combination of computing devices, e.g., a combination of a DSP and a microprocessor, a plurality of microprocessors, one or more microprocessors in conjunction with a DSP core, or any other such configuration. The controller block 110 is installed to a support structure (such as, a frame) of the press-fit machine 100 and is configured to monitor and control the movement of the plurality of press blocks 120 in an independent but interactive manner The movement of the press blocks 120, which can be linear, non-linear or rotational, is translated into the movement and deformation of a plurality of connectors with respect to one or more circuit boards, thereby firmly pressing the connectors and the circuit boards together. The plurality of sensors 130 are provided to the plurality of press blocks 120, such that at least one sensor is operatively associated with a respective press block for providing feedbacks of the pressing operation of each press block. The sensors 130 can be provided at any suitable locations of the respective press blocks 120, although for illustration purpose, FIG. 1 shows certain specific locations of the sensors. The sensors 130 include, but are not limited to, optical sensors, mechanical sensors, magnetic sensors, electrical sensors and any suitable combinations thereof.

In operation, the controller block 110 of the press-fit apparatus 100 receives feedbacks from the sensors 130 and processes the feedback information by a hardware processor of the controller block 110 to generate a plurality of fitting curves (also known as profile curves), which correspond to each individual press block 120. The hardware processor of the controller block 110 can be the same as or similar to the hardware processor 200. Once receiving the fitting curves from the controller block 110, the hardware processor 200 runs one or more programs saved to a memory device, to further process the fitting curves. For example, these fitting curves can be depicted on a screen to permit an operator to visually compare two or more fitting curves or to image-process the fitting curves to achieve additional results.

One exemplary implement for monitoring the pressing force of the press blocks 120 is so-called Shadow Moire method, which requires an optical sensor or a camera to monitor the deformation of the press blocks 120 that is caused by the pressing force on the connectors. Another exemplary implement for monitoring the pressing force is a strain gauge, which is a type of mechanical sensor. The strain gauge is used to directly measure the deformation of the press blocks 120 during a pressing operation. Yet another exemplary implement for monitoring the pressing force is a force sensor, which directly measures the pressure applied onto the press blocks 120. Other suitable tools and implements, in addition to or alternative of the above-described implements, are within the scope of the present disclosure.

The press-fit apparatus 100 as described above is capable of pressing different modular connectors simultaneously. For example, a single press block or a group of press blocks can be tailored for a single modular connector or a group of same modular connectors to apply a proper pressing force, based on the characteristics of the connectors and/or the feedback of the sensor(s) associated with the press block(s). For example, each press block can be configured to rotate at any suitable angle. For example, each press block can travel in three axes defined in the operation space (i.e., X/Y/Z axes). For example, the press blocks can operate independently from each other or interactively with each other in a concerted manner.

Figure 2:
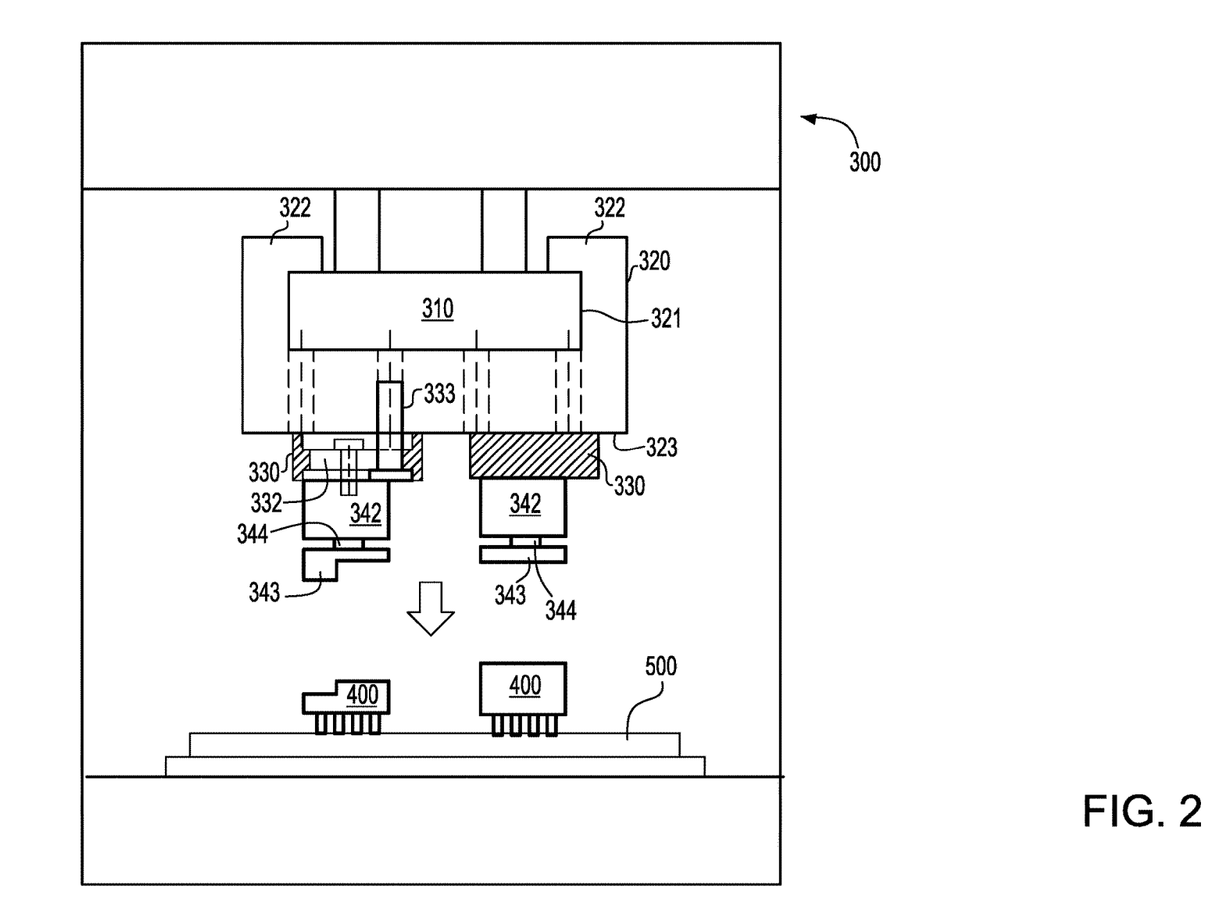
FIG. 2 is a schematic view of a press-fit apparatus according to another exemplary embodiment of the present disclosure.

FIG. 2 shows a press-fit apparatus 300 according to another exemplary embodiment of the present disclosure. The press-fit apparatus 300 includes, but is not limited to, a machine press head 310, a universal press block 320 connected to and movable with the machine press head 310, at least one locating block 330 connected the universal press block 320 at a selectable location, and at least one press block 340 connected to the at least one locating block 330 for selectively pressing a connector 400 to a circuit board 500 (for example, a PCB).

Figure 3:
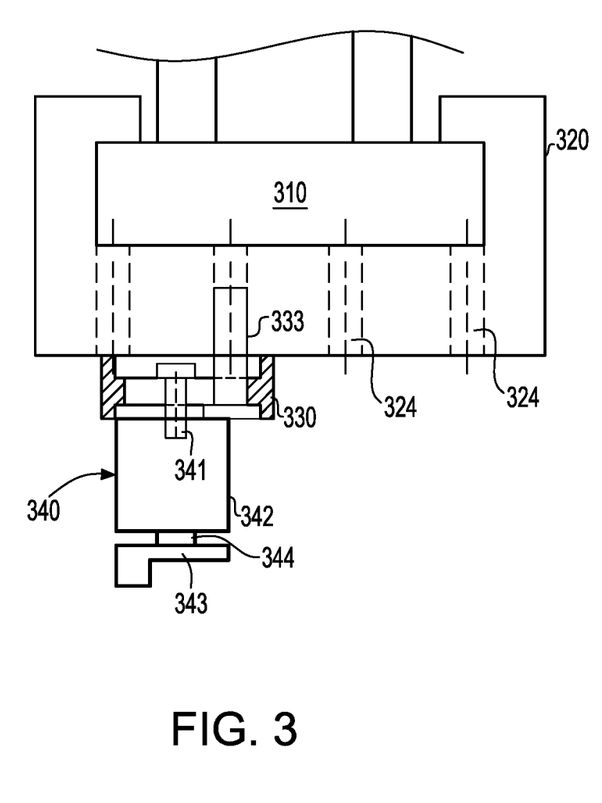
FIG. 3 is a partial sectional view of the apparatus shown in FIG. 2.

FIG. 3 is a partial enlarged sectional view of the press-fit apparatus 300. The machine press head 310 is movable by a power supplier and is thus, capable of moving any structure that is connected to the machine press head 310. The universal press block 320 functions to transfer the pressing force from the press-fit machine to the press block 330. The universal press block 320 can be a substantially hollow or solid structure, which defines a receiving space 321 (also shown in FIG. 2) at the top portion thereof for operatively accommodating the machine press head 310. The receiving space 321 is properly dimensioned to allow the machine press head 310 to be snuggly placed within the receiving space. In addition, the universal press block 320 includes at least one holding arm 322 (also shown in FIG. 2), which extends inwardly to hug the machine press head 310. As such, the machine press head 310 can be firmly fitted within the universal press block 320 and once fitted, the machine press head 310 is substantially enclosed or bonded by the universal press block 320, such that any movement of the machine press head 310 can be precisely transferred to the universal press block 320 in a controllable manner. Alternatively, the receiving space 321 of the universal press block 320 can be modified as a receiving slot, such that the universal press block 320 can be detachably or retrofittably mounted to the machine press head 310, depending the specific circumstances of the pressing application.

Figure 4:
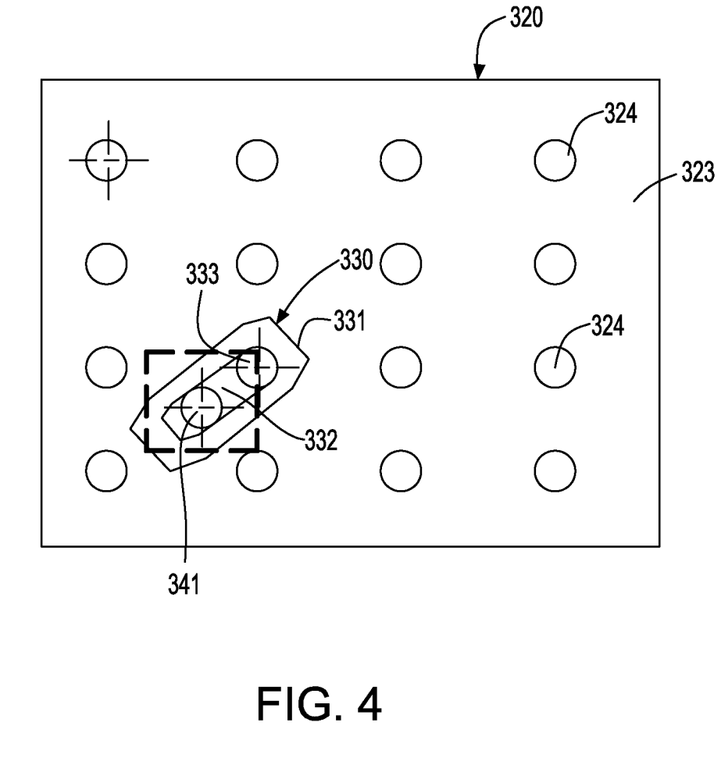
FIG. 4 is a bottom view of the apparatus shown in FIG. 3.

The universal press block 320 has a bottom plate 323, which is also shown in FIG. 4. The bottom plate 323 can be formed integrally with the universal press block 320 or as a separate component that can be attached to the rest of the universal press block 320. The bottom plate 323 includes an array of locating holes 324 that extend inwardly from the bottom surface of the bottom plate 323. The locating holes 324 are arranged to allow the locating block 330 to be selectively attached to the universal press block 320 at predetermined locations. For example, as shown in FIG. 4, the locating holes 324 include four column and four rows of holes, such that the locating block 330 can be attached to the bottom plate 323 to practically cover any desirable location of the bottom plate 323. The arrangement of the locating holes 324 is not limited to the shown embodiment.

The locating block 330 has a peripheral wall 331 for defining a through opening 332 that extends from the top surface to the bottom surface of the locating block 330. The locating block 330 includes at least one locating block screw 333, which can be threaded into a corresponding locating hole 324 of the universal press block 320 for fixedly attaching the locating block 330 onto the universal press block 320. In operation, the locating block 330 serves as an intermediate structure between the universal press block 320 and the at least one press block 340, for indirectly connecting the press block 340 to the universal press block 320 in a fixed but adjustable manner. The press block 340 includes a press block screw 341, by which the press block 340 is fixedly connected to the locating block 330, as shown in FIGS. 3 and 4. In operation, the locating block 330 is first fixed to the universal press block 320 at a predetermined location by threading and tightening the locating block screw 333 in the locating hole 324, passing through the opening 332 of the locating block 330. The specific location and orientation of the locating block 330 with respect to the universal press block 320 can be determined first. Subsequently, the press block 340 is attached to the locating block 330 by threading and tightening the press block screw 341. The through opening 332, when viewed from the bottom perspective, can be in the form of an elongated slot, which allows desirable positional adjustment of the press block 340 along the slot. As such, the press block 340 can be provided at any ideal and desirable position for pressing the connector 400 to the circuit board 500.

The press block 340 is the final part of the apparatus, which transfers the pressing force to the connector 400 that includes one or more compliant pins. As shown in FIGS. 2 and 3, each press block 340 includes a press block body 342, a press block head 343 and at least one sensor 344 provided between the press block body 342 and the press block head 343. The press block head 343 functions to transfer pressing force to the compliant pins of the connector 400. The shape of the press block head 343 is complementary to the shape of the connector 400. The sensor 344 is connected to the press block head 343 to detect and monitor the pressing force applied to the connector 400.

Figure 5:
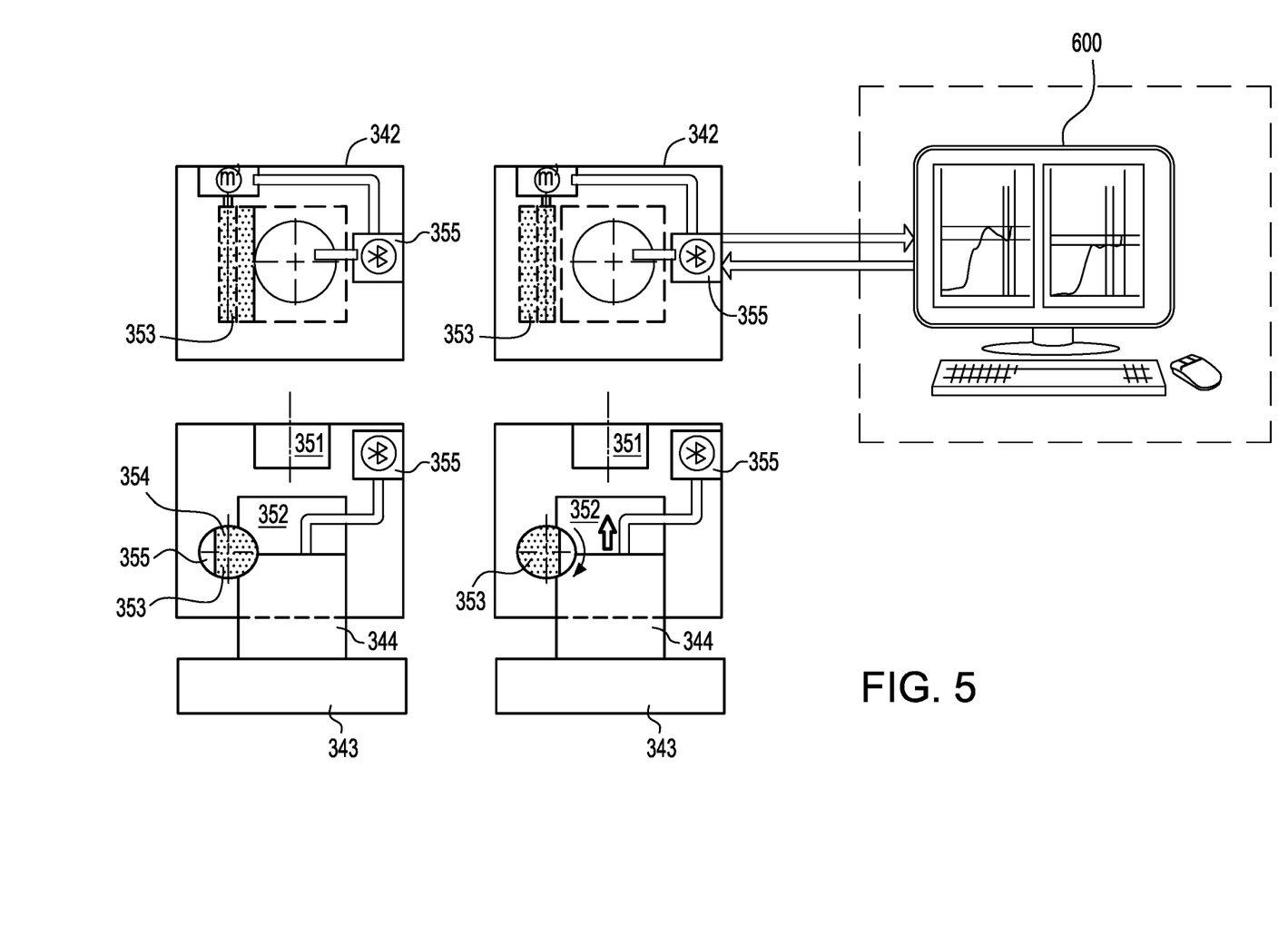
FIG. 5 is a schematic view of the apparatus shown in FIG. 2, for depicting two working conditions of the apparatus as controlled by using a processor.

The press block body 342 is configured to communicate with the sensor 344, control the movement of and force applied by the press block head 343, and further communicate with a processor 600 (shown in FIG. 5) that can be external. Detailed description of the structure and function of the press block body 342 is provided with reference to FIG. 5. FIG. 5 shows two working conditions of the press block 340, as controlled by the press block body 342.

The press block body 342 has a block screw hole 351, through which the press block screw 341 can be extended to affix the press block 340 to the locating block 330. The press block body 342 defines therein a sliding hole 352, in which the sensor 344 is movable in a slidable manner. In operation, the movement of the sensor 344 within the sliding hole 352 can be utilized to continue or terminate the transmission of the pressing force.

The press block body 342 further includes a control bar 353. The control bar 353 is mounted within the press block body 342 and is rotatable by a motor 360. The motor 360 rotates the control bar 353 to switch the control bar 353 between a first configuration thereof and a second configuration thereof. The control bar 353 has a partially circular cross section 354, which is defined by a cut out portion 355 in the cross section. When the control bar 353 is rotated into the first configuration, the partially circular cross section 354 is in contact with the sensor 344, as the sensor 344 moves upwardly within the sliding hole 352. As such, a complete force transmission link is provided by the control bar 353, the sensor 344 and the press block head 343. The press-fit apparatus 300 assumes its normal working condition, as shown by the diagram at the left side of FIG. 5. When the press-fit apparatus 300 is in its normal working condition, the pressing force is transmitted from the press block head 343 to the connector 400, to deform the pins of the connector. When control bar 353 is rotated into the second configuration, the partially circular cross section 354 is no longer in contact with the sensor 344 and the force transmission link is thus broken. The upward movement of the sensor 344 is not blocked by the control bar 353. As a result, the pressing force applied by the press block head 343 is released or liberated.

The press block body 342 further includes a data transmit module 355, which is typically wireless. The data transmit module 355 is in communication with the sensor 344 to receive any feedback signal from the sensor 344. In addition, the data transmit module 355 is in communication with the processor 600, which can be the same as or similar to the processor 200 shown in FIG. 2. The data transmit module 355 sends the data from the sensor 344 to the processor 600, such that the processor can further process the data The data transmit module 355 also receives control instructions from the processor 600 to control the press-fitting of the connectors, for example, by controlling the motor 360 to rotate the control bar 353.

Referring back to FIG. 2, in which two connectors 400, each having compliant pins, are being pressed at a same operation cycle. Specifically, two sets of locating blocks 330 and press blocks 340 are installed to the bottom of the universal locating block 320. Each press block 340 is provided with a press block body, a press block head and a sensor, as described above. Each press block head has a profile that is complementary to the profile of a respective connector. Each press block 340 is also provided with a press block screw, a block screw hole, a sliding hole, a control bar and a data transmit module, as described above. In operation, the two sensors of the press blocks 340 detect and monitor the pressing force applied to the connectors, respectively. The data obtained by the sensors are transmitted to a processor for monitoring the fitting curves or profile curves of the press-fitting operations. The two press blocks can work independently from each other; alternatively, the press blocks can work in an interactive manner. The two press blocks can work simultaneously in the same cycle; alternatively, the press blocks can work selectively in different cycles. For example, depending on the dimensions and tolerances of a first connector, a first cycle can be implemented to complete the press-fitting of the first connector; subsequently, a second cycle is implemented to press-fit the second connector. In addition, by triggering the controlling mechanism of each press block, the motor of the press block can operate to break the link of force transmission and as a result, no further pressing force is applied to the connector after the connector is properly seated on the circuit board, which prevents the connectors and the circuit board from being damaged. The above-described scheme can be extended to provide multiple press blocks to realize collective yet individual pressing of multiple connectors, while preventing undesirable damage to the connectors and the circuit board.

The press-fit apparatus, according to the present disclosure, is advantageous in the following aspects. First, profile curves of each individual connector can be monitored independently or interactively as needed. Secondly, multiple connectors can be press-fitted at a same time, which improves the efficiency of the operation. Thirdly, the press-fit apparatus can be readily retrofitted into any existing operation line. Fourthly, production quality can be improved while improving the production efficiency, since undesirable damage to the connectors and/or the circuit board can be prevented.

Another aspect of the present disclosure relates to a method of press-fitting at least one connector to a circuit board by using a press-fit apparatus, for example, the press-fit apparatus 300.

According to this method, the locating block 330 is fixed to the bottom plate 323 of the universal press block 320 by a user. The locating block 330 is fixed to the bottom plate 323 by inserting the locating block screw 333 selectively into one of the plurality of locating holes 324. Subsequently, the press block 340 is fixed to the locating block 330 at a predetermined position suitable for press-fitting the connector by using a press block screw 341.

Yet another aspect of the present disclosure relates to a method of manufacturing a press-fit apparatus suitable for press-fitting a plurality of connectors to a circuit board. A machine press head is provided, which is movable by a power supplier of the press-fit apparatus. A universal press block is fixed to the machine press head to allow the universal press block to be movable with the machine press head. The universal press block includes a bottom plate having a plurality of locating holes. At least one locating block is fixed to the bottom plate of the universal press block, by inserting a locating fastener of the at least one locating block into one of the plurality of locating holes. At least one press block is fixed to the at least one locating block at a predetermined position suitable for press-fitting one of the plurality of connectors. The at least one press block includes at least one press block fastener for fixedly connecting the at least one press block to the at least one locating block. The press block includes: a press block head, wherein the press block head is movable to be in contact with the one of the plurality of connectors to apply a pressing force to the one of the plurality of connectors; a sensor configured to detect the pressing force and generate a signal indicative of the pressing force; and a press block body configured to receive the signal from the sensor and control the movement of the press block head based on the signal.

Optionally or additionally, the plurality of locating holes of the bottom plate of the universal press block is arranged according to a predetermined pattern.

Optionally or additionally, the locating block is provided with a peripheral wall that defines an elongated slot, such that the press block screw of the at least one press block is slidable along the elongated slot to place the at least one press block at the predetermined position.

Optionally or additionally, the sensor is provided between the press block body and the press block head and to be movable with the press bock head. The press block body defines a sliding hole and at least a portion of the sensor is moveable within the sliding hole.

Optionally or additionally, the press block body is provided with a control bar that is rotatably by a motor. The control bar has a partially circular cross section defined by a cut out in a cross section of the control bar. The control bar includes a first configuration and a second configuration that are switchable when the control bar is rotated by the motor. When the control bar is at the first configuration, the control bar is in contact with the portion of the sensor, such that a complete force transmission link is formed by the control bar, the sensor and the press block head for transmitting a pressing force to the one of the plurality of connectors. When the control bar is at the second configuration, the control bar is not in contact with the portion of the sensor, such that a pressing force is not transmitted to the one of the plurality of connectors.

Optionally or additionally, the press block body is provided with a data transmit module. The data transmit module is in communication with the sensor to receive the signal from the sensor. The data transmit module is further in communication with a processor, such that the data transmit module sends the signal to the processor and receives an instruction signal from the processor for controlling the rotation of the control bar.

Optionally or additionally, the at least one locating block includes a first locating block and a second locating block. Each locating block includes a locating block screw for fixedly connecting the locating block to the universal press block. The at least one press block includes a first press block and a second press block. The first press block is fixedly connected to the first locating block and the second press block is fixedly connected to the second locating block. The first press block has a first press profile and the second press block has a second press profile that is different from the first press profile.

While the present application has been particularly shown and described with respect to various embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A press-fit apparatus for press-fitting a plurality of connectors to a circuit board, the apparatus comprising:
   a machine press head, wherein the machine press head is movable by a power supplier of the press-fit apparatus;
   a universal press block, wherein the universal press block is fixedly connected to the machine press head to be movable with the machine press head, wherein the universal press block comprises a bottom plate having a plurality of locating holes;
   at least one locating block, wherein the at least one locating block is fixedly connected to the bottom plate, wherein the at least one locating block comprises a locating fastener, wherein the locating fastener is inserted into one of the plurality of locating holes to fixedly connect the at least one locating block to the universal press block; and
   at least one press block, wherein the at least one press block is fixedly connected to the locating block at a predetermined position suitable for press-fitting one of the plurality of connectors, wherein the at least one press block comprises a press block fastener for fixedly connecting the at least one press block to the at least one locating block,
   wherein the at least one press block comprises:
   a press block head, wherein the press block head is movable to be in contact with the one of the plurality of connectors to apply a pressing force to the one of the plurality of connectors;
   a sensor configured to detect the pressing force and generate a signal indicative of the pressing force; and
   a press block body configured to receive the signal from the sensor and control the movement of the press block head based on the signal,
   wherein the sensor is provided between the press block body and the press block head;
   wherein the senor is movable with the press block head; and
   wherein the press block body defines a sliding hole and wherein at least a portion of the sensor is moveable within the sliding hole.

2. The apparatus according to claim 1, wherein the universal press block defines a receiving space for substantially enclosing the machine press head.

3. The apparatus according to claim 2, wherein the universal press block comprises at least one holding arm that fixedly connects the universal press block to the machine press head.

4. The apparatus according to claim 1, wherein the plurality of locating holes of the bottom plate of the universal press block are arranged according to a predetermined pattern.

5. The apparatus according to claim 4,
   wherein the at least one locating block comprises a peripheral wall defining an elongated slot; and
   wherein the press block fastener of the at least one press block is slidable along the elongated slot, such that the at least one press block is placed at the predetermined position.

6. The apparatus according to claim 1,
   wherein the press block body comprises a control bar that is rotatable by a motor,
   wherein the control bar has a partially circular cross section defined by a cut out in a cross section of the control bar;
   wherein the control bar comprises a first configuration and a second configuration that are switchable when the control bar is rotated by the motor;
   wherein when the control bar is at the first configuration, the control bar is in contact with the portion of the sensor, such that a complete force transmission link is formed by the control bar, the sensor and the press block head for transmitting a pressing force to the one of the plurality of connectors; and
   wherein when the control bar is at the second configuration, the control bar is not in contact with the portion of the sensor, such that a pressing force is not transmitted to the one of the plurality of connectors.

7. The apparatus according to claim 6,
   wherein the press block body comprises a data transmit module;
   wherein the data transmit module is in communication with the sensor to receive the signal from the sensor; and
   wherein the data transmit module is further in communication with a processor, such that the data transmit module sends the signal to the processor and receives an instruction signal from the processor for controlling the rotation of the control bar.

8. The apparatus according to claim 1,
   wherein the at least one locating block comprises a first locating block and a second locating block, wherein each locating block comprises a locating fastener for fixedly connecting the locating block to the universal press block;
   wherein the at least one press block comprises a first press block and a second press block, wherein the first press block is fixedly connected to the first locating block and the second press block is fixedly connected to the second locating block; and
   wherein the first press block has a first press profile and the second press block has a second press profile that is different from the first press profile.

9. A method of manufacturing a press-fit apparatus suitable for press-fitting a plurality of connectors to a circuit board, the method comprising:
   providing a machine press head that is movable by a power supplier of the press-fit apparatus;
   fixing a universal press block to the machine press head to allow the universal press block to be movable with the machine press head, wherein the universal press block comprises a bottom plate having a plurality of locating holes;
   fixing at least one locating block to the bottom plate of the universal press block, by inserting a locating fastener of the at least one locating block into one of the plurality of locating holes; and
   fixing at least one press block to the at least one locating block at a predetermined position suitable for press-fitting one of the plurality of connectors, wherein the at least one press block comprises at least one press block fastener for fixedly connecting the at least one press block to the at least one locating block,
   wherein the at least one press block comprises:
   a press block head, wherein the press block head is movable to be in contact with the one of the plurality of connectors to apply a pressing force to the one of the plurality of connectors;

a sensor configured to detect the pressing force and generate a signal indicative of the pressing force; and a press block body configured to receive the signal from the sensor and control the movement of the press block head based on the signal, wherein the sensor is provided between the press block body and the press block head;

wherein the senor is movable with the press block head; and wherein the press block body defines a sliding hole and wherein at least a portion of the sensor is moveable within the sliding hole.

10. The method according to claim 9, further comprising arranging the plurality of locating holes of the bottom plate of the universal press block according to a predetermined pattern.

11. The method according to claim 10, further comprising providing the at least one locating block with a peripheral wall that defines an elongated slot, such that the press block screw of the at least one press block is slidable along the elongated slot to place the at least one press block at the predetermined position.

12. The method according to claim 9, further comprising providing the sensor between the press block body and the press block head and to be movable with the press block head; and wherein the press block body defines a sliding hole and at least a portion of the sensor is moveable within the sliding hole.

13. The method according to claim 9, further comprising providing the press block body with a control bar that is rotatable by a motor, wherein the control bar has a partially circular cross section defined by a cut out in a cross section of the control bar;

wherein the control bar comprises a first configuration and a second configuration that are switchable when the control bar is rotated by the motor;

wherein when the control bar is at the first configuration, the control bar is in contact with the portion of the sensor, such that a complete force transmission link is formed by the control bar, the sensor and the press block head for transmitting a pressing force to the one of the plurality of connectors; and wherein when the control bar is at the second configuration, the control bar is not in contact with the portion of the sensor, such that a pressing force is not transmitted to the one of the plurality of connectors.

14. The method according to claim 13, further comprising providing the press block body with a data transmit module;

wherein the data transmit module is in communication with the sensor to receive the signal from the sensor; and wherein the data transmit module is further in communication with a processor, such that the data transmit module sends the signal to the processor and receives an instruction signal from the processor for controlling the rotation of the control bar.

15. The method according to claim 9, wherein the at least one locating block comprises a first locating block and a second locating block, wherein each locating block comprises a locating block screw for fixedly connecting the locating block to the universal press block;

wherein the at least one press block comprises a first press block and a second press block, wherein the first press block is fixedly connected to the first locating block and the second press block is fixedly connected to the second locating block; and wherein the first press block has a first press profile and the second press block has a second press profile that is different from the first press profile.

\* \* \* \* \*